Feb. 21, 1967  BO ANDERS V. HAGNER  3,305,424
METHOD OF MAKING A SHEET FOR PHILATELIC USE
Original Filed June 20, 1961

INVENTOR

BO ANDERS VILHEIM HAGNER

United States Patent Office 3,305,424
Patented Feb. 21, 1967

3,305,424
METHOD OF MAKING A SHEET FOR PHILATELIC USE
Bo Anders Vilhelm Hagner, Nasby Park, Sweden
Original application June 20, 1961, Ser. No. 118,459. Divided and this application June 3, 1963, Ser. No. 285,078
2 Claims. (Cl. 156—268)

This application is a division of my application Serial No. 118,459, filed June 20, 1961, for Improvements in a Sheet for Philatelistic Use, now abandoned.

This invention relates to methods of making sheets for use in philately as well as for collecting plane light objects other than postage stamps. The sheet is substantially characterized in that on a sheet-shaped support are secured a plurality of transparent strips made of a flexible material, preferably plastics, such that the strips are secured along a narrow portion of at least one edge.

The method according to the invention is characterized in that an entire sheet of a flexible transparent plastic material is laid upon a sheet-shaped support which is provided with one or a plurality of adhesive lines arranged in parallel, that the plastic material, in the event that a plurality of adhesive lines are provided, is worked with a cutting tool close to and below the adhesive lines such, that between the plastic material and the said sheet-shaped support pockets are formed which can be opened.

The method is further characterized in that the plastic material which shows a natural curvature owing to its storage in rolled state, is cut to size and laid on the sheet-shaped support to be joined thereto, in such a manner, that the concave surface faces the sheet-shaped support, and the adhesive lines are located perpendicularly to the curvature.

Figure 1:
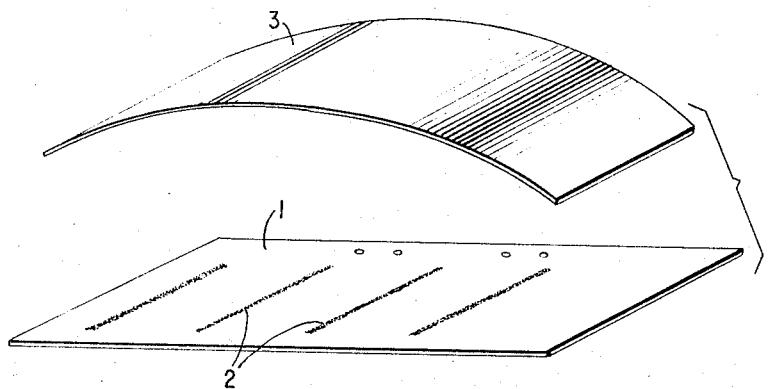
Figure 2:
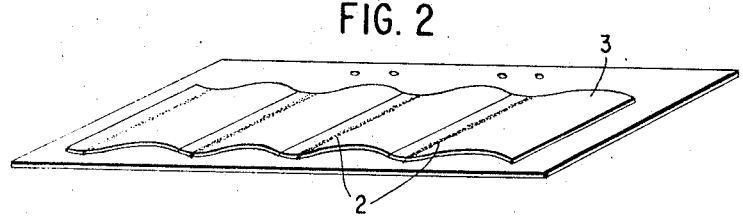
Figure 3:
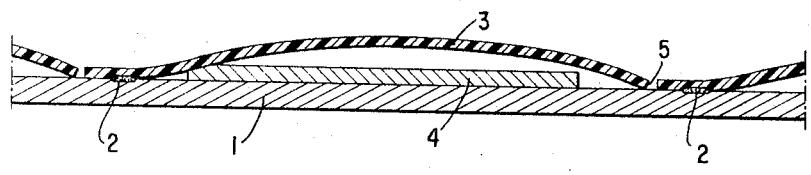

The invention will be described in greater detail in the following, reference being had to the accompanying drawings. FIGS. 1 and 2 represent different steps of the method according to the invention, and FIG. 3 shows on an enlarged scale a section through the sheet with a collection piece inserted.

The sheet to be produced by the present method comprises a sheet-shaped support 1 which may be cardboard or another suitable material which on one or both sides by means of adhesive lines 2 holds a plurality of strips 3 of transparent flexible material, preferably plastics, in such a manner, that between the cardboard 1 and the strips 3 pockets are formed which are open upwardly as well as on one or both sides.

The method for making the sheet can be carried out in different ways, the following one being the most favorable.

To the sheet-shaped support 1 is secured by adhesive lines 2 an entire sheet of the transparent flexible material 3. Thereafter, or at the same time, a cutting tool is applied to the transparent material close to and below each adhesive line. The material need not be cut through, but a scratched slit will be sufficient. When a pocket is to be opened for the first time, a tweezers or the like is inserted from the side, whereby the pocket is slit open.

As transparent flexible material is employed preferably such material which owing to its storage in rolls was given a permanent curvature. The material is laid on the cardboard in the manner shown in FIG. 3 such, that the concave surface faces the cardboard and the adhesive lines extend perpendicularly to the curvature. Thereby in spite of the fact that a strip is secured at its lower edge and a collection piece is inserted, the upper edge of the strip will abut the cardboard (FIGS. 2 and 3), whereby additional protection for the collection piece is attained by keeping dust and small foreign matter out.

I claim:
1. The method of making a device for use in storing small flat objects such as postage stamps comprising laying on a rigid sheet of cardboard a plurality of parallel spaced lines of adhesive, biasing a sheet of flexible, transparent material to have a curvature in the direction of one of its dimensions, placing said biased flexible transparent sheet on said rigid sheet with its direction of curvature extending perpendicular to said lines of adhesive with the concave side of said curved sheet against said rigid sheet, securing said sheets together along said lines of adhesive, and cutting said flexible sheet along lines located adjacent one edge of and close to said lines of adhesive, thereby forming outwardly bulged pockets between said sheets which can be opened for receiving said small objects.

2. The method according to claim 1 and in which the flexible sheet is first cut to a size as will substantially cover the rigid sheet.

References Cited by the Examiner
UNITED STATES PATENTS

| | | | |
|---|---|---|---|
| 2,234,058 | 3/1941 | Murray | 156—291 |
| 2,237,346 | 4/1941 | Gilfillan | 156—291 |
| 2,515,806 | 7/1950 | Spanel | 156—290 |
| 3,060,075 | 10/1962 | Kincaid | 156—251 |

EARL M. BERGERT, Primary Examiner.
DOUGLAS J. DRUMMOND, Examiner.